(12) United States Patent
Kephart

(10) Patent No.: US 6,439,252 B1
(45) Date of Patent: Aug. 27, 2002

(54) LIQUID DE-ICER PRODUCTION APPARATUS AND METHOD

(75) Inventor: Edward L. Kephart, Farwell, MN (US)

(73) Assignee: VariTech Industries, Inc., Garfield, MN (US)

( * ) Notice: Subject to any disclaimer, the term of this patent is extended or adjusted under 35 U.S.C. 154(b) by 0 days.

(21) Appl. No.: 09/843,442

(22) Filed: Apr. 26, 2001

(51) Int. Cl.⁷ .............................................. G05D 11/02
(52) U.S. Cl. .............................................. 137/3; 137/91
(58) Field of Search ...................................... 137/91, 3

(56) References Cited

U.S. PATENT DOCUMENTS

| | | | | |
|---|---|---|---|---|
| 1,664,840 A | * | 4/1928 | Wermine | 137/91 |
| 3,195,551 A | * | 7/1965 | Russell | 137/5 |
| 3,428,487 A | * | 2/1969 | Allen | 127/22 |
| 3,765,436 A | * | 10/1973 | Dziomba et al. | 137/88 |
| 3,800,026 A | | 3/1974 | Morgan | 423/179 |
| 4,252,139 A | * | 2/1981 | Davis et al. | 137/3 |
| 5,169,406 A | | 12/1992 | Tewari | 23/293 R |
| 5,419,355 A | | 5/1995 | Brennan et al. | 137/1 |
| 5,447,063 A | * | 9/1995 | Glassey | 73/433 |
| 5,792,343 A | | 8/1998 | Fujita et al. | 210/96.1 |
| 5,819,776 A | | 10/1998 | Kephart | 137/1 |

* cited by examiner

Primary Examiner—Stephen Hepperle
(74) Attorney, Agent, or Firm—Nikolai & Mersereau, P.A.

(57) ABSTRACT

An apparatus and method for automatically producing a desired specific gravity of a salt solution used for deicing highways. Highway departments can produce a high volume of salt solution of a desired specific gravity by a machine that automatically feeds salt and water into a hopper tank to produce brine, then automatically measures and adjusts the specific gravity of the brine by adding greater or lesser amounts of fresh water to the brine removed from the hopper tank. The salt added to the hopper tank contains impurities, which are removed by self-cleaning strainers. The sediment so removed flows to a trash tank. Sediment in the trash tank settles to the bottom thereof and the liquid collected is filtered by another set of self-cleaning strainers such that liquid from the trash tank can be sent to the hopper tank. The device automatically records the specific gravity of the solution produced.

12 Claims, 1 Drawing Sheet

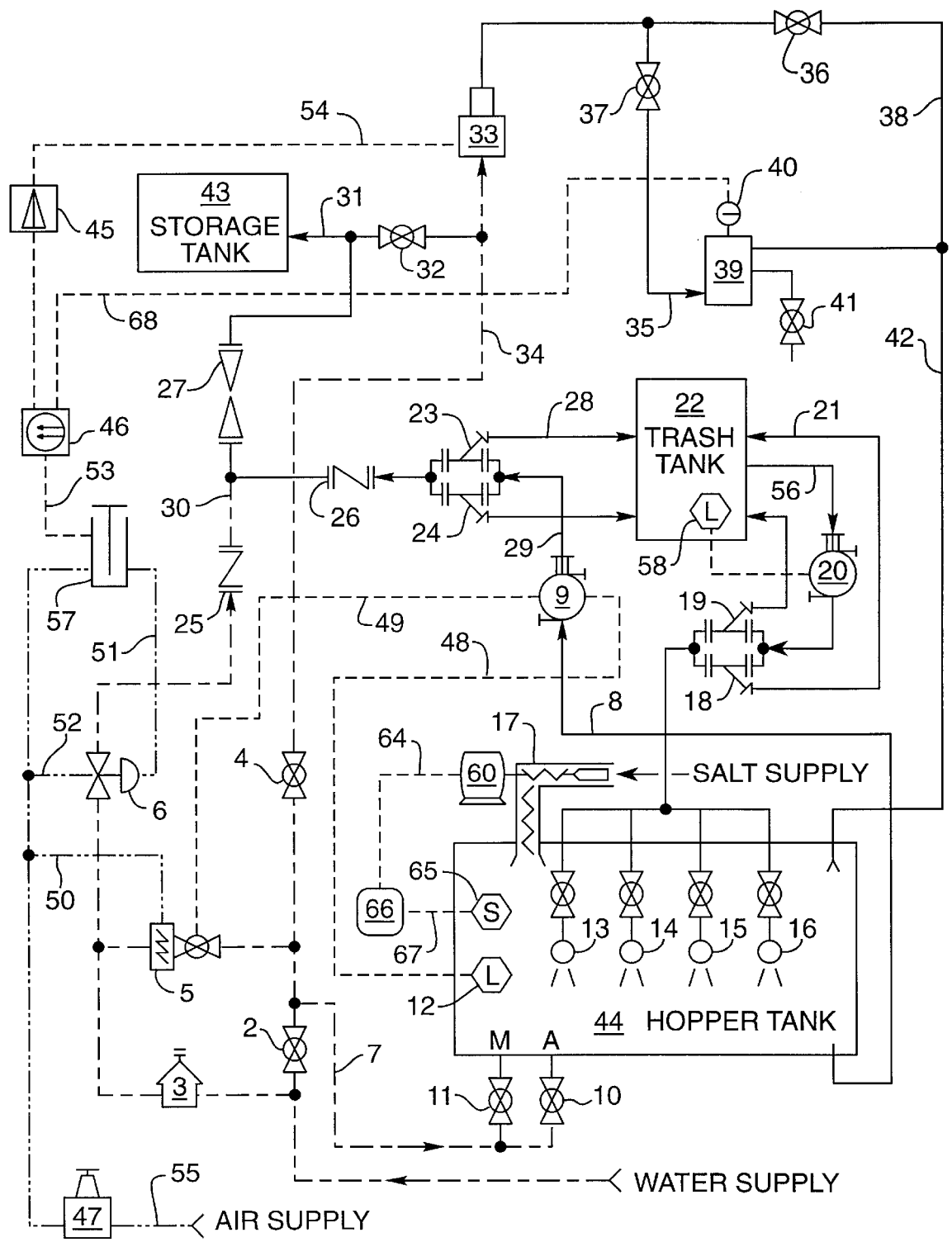

LIQUID DE-ICER PRODUCTION APPARATUS AND METHOD

BACKGROUND OF THE INVENTION

1. Field of the Invention

The present invention relates generally to an apparatus and method for dissolving a chemical in a liquid and more particularly for dissolving rock salt or calcium magnesium acetate (CMA) pellets in water for producing a salt solution of a specified concentration of salinity to be used as a liquid de-icer.

2. Description of the Related Art

Chemical solutions formed by dissolving a solid chemical in a liquid have been used in a variety of industrial applications, including the use of a salt solution for melting and removal of snow and ice from sidewalks, driveways, roadways, runways and the like. These solutions may be generally created by directing a liquid through an amount of the chemical to be dissolved, such as rock salt or CMA pellets, to produce a highly concentrated or saturated solution. The solution is then adjusted to a desired salinity for use on roadways. It has been found that a solution of 23.3% by weight is the most efficient solution for removing ice and snow (where sodium chloride is the salt). At this salinity level the solution will melt ice and snow with an ambient temperature of −11 degrees Fahrenheit. If the desired salinity is not maintained in the solution and applied in the correct amounts on the streets accidents may occur. It is desired to quickly and accurately produce large quantities of solution at a specified salinity for use by road maintenance crews to rid roadways of ice and snow. Highway maintenance crews typically store a large pile of salt, which must then be quickly and accurately added to a solution for loading trucks during and just after storms for road maintenance. Highway departments have heretofore had problems quickly producing large quantities of salt solutions at the desired salinity for best results.

Apparatus used for producing saline solutions for highway maintenance have used various methods for controlling the salinity. The methods include adding water to a tank filled with a salt. With the flow rates and tank measurements known approximations of the desired salinity can be achieved, however accurate salinity results are sacrificed in order to quickly produce a solution for immediate use.

Other apparatus for producing accurate saline solution include adding water to a batch of salt in a tank to create a high concentration of salt in solution and then adding water to the solution until the correct salinity is reached. It has been a problem to acheive this without a labor intensive apparatus, as measurements for salinity, adjustments to water flow rates, cleaning of screens to separate dirt and other particles form the salt solution and adding salt to the tanks have all been labor intensive steps.

SUMMARY OF THE INVENTION

The invention is an apparatus and method for automatically producing large quantities of dissolved rock salt or calcium magnesium acetate (CMA) pellets in water for producing a salt solution to be used as a liquid de-icer to be used for spraying roadways, sidewalks, driveways and runways to melt snow and ice.

A supply of rock salt or calcium magnesium acetate (CMA) pellets is stored in a hopper having an auger for feeding the salt or (CMA) into a hopper tank. The auger is operated automatically to add the salt or (CMA) when the hopper tank supply of salt or (CMA) is becoming low. Water is added to the hopper tank to dissolve the salt or (CMA) at the bottom of the hopper tank to create a flow of concentrated (100%) brine solution flowing from the hopper tank. The brine solution from the hopper tank then passed through cleaning strainers for removing sediment and other materials from the brine solution. Fresh water is added to the flow of brine solution and mixed therein. An electronic hydrometer (a specific gravity measuring device) measures the SG of the brine/water solution. If the specific gravity is too high or too low a valve is opened or closed to adjust the amount of fresh water to the mixture. In this manner the mixture is automatically adjusted to the salinity desired. The electronic hydrometer records the salinity of the mixture being produced. A sample of the mixture produced is measured for its temperature automatically by a digital thermometer as part of the specific gravity measurement. The saline solution produced is stored in a storage tank and then loaded into trucks for spreading on the streets to melt ice and snow.

Sediment and other material collected is sent in a stream of saline solution to a trash tank which is periodically cleaned out. The saline solution from the trash tank is filtered and sent to the hopper tank so that the trash tank does not overflow. The sediment and other material screened from the flow to the hopper tank is sent back to the trash tank.

OBJECTS OF THE INVENTION

It is an object of the invention to produce saline solutions with accurately controlled specific gravities.

It is an object of the invention to automatically add salt to a tank to continuously produce saline solutions with accurately controlled specific gravities.

It is an object of the invention to automatically remove contaminants from the saline solutions produced.

It is an object of the invention to automatically adjust the amount of water added to a saline solution to accurately control its specific gravity.

It is an object of the invention to automatically and continuously record the specific gravity of the saline solution being produced.

It is an object of the invention to reduce the labor required to make large quantities of saline solutions.

Other objects, advantages and novel features of the present invention will become apparent from the following detailed description of the invention when considered in conjunction with the accompanying drawing.

BRIEF DESCRIPTION OF THE DRAWINGS

The FIGURE is a schematic diagram of the liquid de-icer production apparatus.

DESCRIPTION OF THE PREFERRED EMBODIMENTS

The present invention is an apparatus and method for producing a liquid brine solution, automatically, utilizing electronic and pneumatic equipment in such a manner that there is no operator involvement, beyond setting the parameters for production performance. The apparatus consists of a hopper tank 44 that holds rock salt, with a certain capacity for holding an amount of pure concentrated brine solution, a trash tank 22 that provides containment for sediment and non-salt residue, a storage tank 43 for the finished brine solution, and an augering system 17 for introducing rock salt, as it is needed. The apparatus operates by first introducing fresh water into the system through pipe 1 through water pressure regulator 3, which maintains a constant water pressure available to the system. Hopper tank 44 has liquid level switch 12, which in the embodiment shown has four different position settings. The liquid level switch 12 sends an electronic signal to an air actuator valve 5 for controlling the flow of water to hopper tank 22. The air actuator valve 5 receives air pressure though air line 50 from air pressure regulator 47 connected to an air supply source not shown. Although in the embodiment shown the actuator valve 5 is air activated any means for activating the valve may be used.

With the air actuator valve 5 open fresh water flows through pipe 7, then through ball valves 10 and 11, to provide water to the base of the hopper in tank 44. Once the water filters upward through the rock salt bed, the brine concentrate can either be pumped out of hopper tank 44, using pump 9, through pipe 8, or forced out of hopper tank 44 using the available city water pressure, to cause the brine concentrate to flow through pipe 8 to pipe 29. The brine concentrate is passed through two self-cleaning strainers 23 and 24, which filters the non-salt residue and sediment out of strainers 23 and 24, and sends it through pipe 28 into trash tank 22. The filtered brine then flows from strainers 23 and 24 through check valve 26, which is a one-way check valve. As the brine flows into pipe 30, it mixes with the fresh water that passes through positioner valve 6. Check valve 25 prevents a brine solution from flowing backwards towards valve 6. As the fresh water from valve 6 joins with the brine pumped through pipe 29 and strainers 23 and 24, through check valve 26, the mixture then passes through an in line static mixer 27 which mixes and enjoins the brine and fresh water. The mixture then travels through pipe 31 into storage tank 43. Immediately after the static mixer 27, a small sample of the mixture flows through a small ball valve 32, and into an electronic specific gravity hydrometer measuring device 33 which sends an electrical measurement to controller 45 for converting the electrical reading to a specific gravity measurement and sends the information of specific gravity to a chart-recording device 46, into which the desired specific gravity has been pre-set. The chart recorder 46, then sends a signal to the positioner valve 6 to either open more or close, thereby regulating the amount of fresh water entering and mixing with the brine in pipe 31, which dilutes the mixture until the desired specific gravity that has been pre-set in recorder 46, is attained.

In the embodiment shown an electric signal on the order of 4–20 mA from the chart recording device is sent though wire 53 to converter 57 which converts the 4–20 mA electrical signal to a 3–15 psi pneumatic signal, and sends the pneumatic pressure from the air pressure regulator 47 to positioner valve 6 through pneumatic pipe 51 such that the pneumatic signal opens or closes valve 6. The sample of mixture that passes through hydrometer 33 flows through ball valve 37 into pipe 35, then into a temperature sensing sample port 39. A digital thermometer 40 is mounted at the top of sample port 39, which provides an indication of the temperature of the solution which is sent over wire 68 to recorder 46. Alternatively the temperature can be taken at thermometer 40 at the beginning of the process and manually entered into the recorder 46 since the temperature of the water coming into hopper tank 44 will not be changing during the operation of the system. The temperature of the solution is important to the ability to pre-set the desired specific gravity, since the recorder 46 incorporates an automatic temperature compensation feature that effects the actual salinity saturation ability of the mixture. On one side of the temperature sensor port 39, is a small ball valve 41 that allows the operator the ability to collect a small sample of the brine mixture, so that a manual specific gravity test can be taken to cross reference the specific gravity indicated on the recorder 46. If there are any discrepancies, then the operator can make adjustments or troubleshoot the system to determine the cause of the discrepancies in specific gravity of the solution. The sampled solution flows through the temperature sensor port 39, then through pipe 42, and back into the brine-making vessel or hopper tank 44.

During the process of making "finished" brine, a large amount of non-salt residue and sediment is flushed out of the system through the self-cleaning strainers 23 and 24. The residue is collected in the trash tank 22. Once the liquid level switch 58 in trash tank 22 senses a full tank liquid level, an electric signal is sent to pump 20 which then pumps the liquid in tank 22, back through another series of self cleaning strainers 18 and 19, and into the hopper tank 44 through ball valve and sprinkle heads 13, 14, 15 and 16. The liquid that comes from trash tank 22 is then processed once again through the previously described process. The residue from self-cleaning strainers 18 and 19 is returned to the trash tank 22. The trash tank is periodically cleaned out to remove the sediment collected therein.

Due to the high volume of brine that is produced using the automated system, a very large amount of rock salt is required. The rock salt is conveyed from a dry salt hopper, (not shown) through auger 17, which is controlled by a salt level switch 65 and a timer 66 to maintain a level of salt in hopper 44, adequate enough to produce a fully 100% saturation level of salt into water. Once the level of salt in hopper tank 44 drops down to a pre-set level, then a signal is electrically sent to the auger motor 60, which is then turned on. The auger motor 60 is connected to a timer 66 by wire 64. When the auger motor 60 turns on, an electrical signal is sent to turn on the timer. The timer allows the auger motor to run in the on position for a pre-determined length of time. The time required is dependent upon the amount of rock salt that is desired to be dispensed into hopper tank 44.

Fresh water from fresh water pipe 7 can be used to clean the electrical specific gravity hydrometer measuring device 33 by opening ball valve 4 allowing water to flow through pipe 34 to the electrical specific gravity hydrometer measuring device 33. The water can then flow through ball valve 36 to pipe 38 which leads to pipe 42 which empties into hopper tank 42. Alternatively the fresh water can flow from the specific gravity hydrometer measuring device 33 through ball valve 37 through pipe 35 to clean out the temperature sensor port 39 and the digital thermometer 40 before flowing in pipe 42 to hopper tank 44.

Obviously, many modifications and variations of the present invention are possible in light of the above teachings. It is therefore to be understood that, within the scope of the appended claims, the invention may be practiced otherwise than as specifically described.

What is claimed is:

1. An apparatus for producing de-icing salt solution comprising:
   a hopper tank in which water and salt are mixed to form a salt solution,
   a pump for pumping the salt solution from the hopper tank in a first pipe,
   a fresh water pipe having an adjustable valve for supplying fresh water to the first pipe,
   a mixer for mixing the fresh water from the fresh water pipe and the salt solution from the first pipe, connected to a second pipe for transporting the fresh water salt solution mixture, a specific gravity measuring device and a temperature measuring device for automatically measuring the specific gravity and temperature of the fresh water salt solution mixture in the second pipe, and a means for automatically adjusting the adjustable valve to add more fresh water if the specific gravity in the specific gravity measuring device is too high for the temperature measured and for automatically adjusting the adjustable valve to add less fresh water if the specific gravity in the specific gravity measuring device is too low for the temperature measured, such that the resulting salt solution in the second pipe has a desired specific gravity and the second pipe is connected to a storage tank for the storage of the desired specific gravity saline solution.

2. An apparatus for producing de-icing salt solution as in claim 1 wherein, a self cleaning strainer in the first pipe removes sediment from the saline solution and sends it to a trash tank.

3. An apparatus for producing de-icing salt solution as in claim 1 wherein, the hopper tank has a liquid level switch connected to a select fresh water valve for automatically adding fresh water to the hopper tank when the water level gets too low, and the hopper tank has a salt level switch connected to an auger for automatically adding salt to the hopper tank when the salt level gets too low.

4. An apparatus for producing de-icing salt solution as in claim 3 wherein, a self cleaning strainer in the first pipe removes sediment from the saline solution and sends it to a trash tank.

5. An apparatus for producing de-icing salt solution as in claim 2 wherein, the trash tank has an outflow pipe connected to the hopper tank a self cleaning strainer between the trash tank and the hopper tank and a removes sediment from the outflow pipe and sends it to a trash tank.

6. An apparatus for producing de-icing salt solution as in claim 4 wherein, the trash tank has an outflow pipe connected to the hopper tank a self cleaning strainer between the trash tank and the hopper tank and a removes sediment from the outflow pipe and sends it to a trash tank.

7. An apparatus for producing de-icing salt solution as in claim 1 wherein, a recording device records the time, the specific gravity and temperature of the salt solution produced for storage in the storage tank.

8. An apparatus for producing de-icing salt solution as in claim 6 wherein, a recording device records the time, the specific gravity and temperature of the salt solution produced for storage in the storage tank.

9. An method for producing de-icing salt solution comprising:

automatically adding salt and water to a hopper tank to keep the salt and water levels up for producing a brine solution, transporting the brine solution from the hopper tank, adjusting a valve for adding a flow of fresh water to the brine solution pumped from tank, mixing the fresh water and brine solution, measuring the specific gravity and temperature of the mixed fresh water and brine solution, automatically adjusting the volume of the fresh water flow mixed with the brine solution to increase the flow of fresh water if the specific gravity is above a desired level and decreasing the flow of fresh water if the specific gravity is below a desired level, storing the mixed fresh water and brine solution of the desired specific gravity in a storage tank.

10. An method for producing de-icing salt solution as in claim 9 further comprising, straining the sediment from the hopper tank with a self cleaning strainer to removes sediment from the saline solution and send it to a trash tank.

11. An method for producing de-icing salt solution as in claim 10 further comprising, piping the contents of the trash tank to the hopper tank and straining the sediment from the trash tank with a self cleaning strainer to removes sediment from the saline solution and send it to a trash tank. tank.

12. An method for producing de-icing salt solution as in claim 11 further comprising, recording the date, time, specific gravity and temperature of the salt solution produced for storage in the storage tank.

* * * * *

UNITED STATES PATENT AND TRADEMARK OFFICE
CERTIFICATE OF CORRECTION

PATENT NO. : 6,439,252 B1
DATED : August 27, 2002
INVENTOR(S) : Edward L. Kephart It is certified that error appears in the above-identified patent and that said Letters Patent is hereby corrected as shown below:

Column 3,
Line 6, change "22" to -- 44 --.

Column 5,
Line 44, delete "and a" and insert -- that --.

Column 6,
Lines 9, 30, 35 and 42, change "An" to -- A --.
Line 17, delete "pumped from" and insert -- transported from the -- .
Line 32, delete "the" (first occurrence).
Line 40, delete "removes" and insert -- remove the --.
Line 41, delete "tank." (second occurrence)

Signed and Sealed this

Nineteenth Day of August, 2003

JAMES E. ROGAN
*Director of the United States Patent and Trademark Office*